United States Patent
Sandoval

(10) Patent No.: US 11,451,178 B2
(45) Date of Patent: *Sep. 20, 2022

(54) MOTOR DRIVE OPERATION AT LIGHT LOAD CONDITIONS

(71) Applicant: Lennox Industries Inc., Richardson, TX (US)

(72) Inventor: Jose Juan Sandoval, The Colony, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/210,297

(22) Filed: Mar. 23, 2021

(65) Prior Publication Data

US 2021/0211081 A1 Jul. 8, 2021

Related U.S. Application Data

(63) Continuation of application No. 16/529,530, filed on Aug. 1, 2019, now Pat. No. 11,012,018.

(51) Int. Cl.
| | |
|---|---|
| *H02P 23/02* | (2006.01) |
| *H02P 27/08* | (2006.01) |
| *F24F 11/46* | (2018.01) |
| *F24F 140/50* | (2018.01) |
| *F24F 110/10* | (2018.01) |

(52) U.S. Cl.
CPC .............. *H02P 23/02* (2013.01); *F24F 11/46* (2018.01); *H02P 27/085* (2013.01); *F24F 2110/10* (2018.01); *F24F 2140/50* (2018.01)

(58) Field of Classification Search
CPC .. H02P 23/02; H02P 9/00; H02P 21/02; H02P 29/40; F24F 11/46; F24F 2140/50; F24F 2110/10
See application file for complete search history.

(56) References Cited

U.S. PATENT DOCUMENTS

| | | | |
|---|---|---|---|
| 7,898,198 B2* | 3/2011 | Murphree | H02P 23/03 318/434 |
| 8,698,433 B2* | 4/2014 | Green | H02P 21/06 318/432 |
| 2011/0083467 A1 | 4/2011 | Asano et al. | |
| 2020/0191454 A1 | 6/2020 | McGill et al. | |
| 2021/0036642 A1 | 2/2021 | Sandoval | |

* cited by examiner

*Primary Examiner* — Said Bouziane
(74) *Attorney, Agent, or Firm* — Baker Botts L.L.P.

(57) ABSTRACT

A system includes a motor-driven component, a motor configured to operate the motor-driven component, and a motor drive circuit configured to power the motor. The motor drive circuit includes at least one complementary stage, where each stage includes a first transistor and a second transistor. During operation of the motor drive circuit, the first transistor is switched on when the second transistor is switched off. The system includes a controller communicatively coupled to the motor drive circuit. A load condition associated with the component is monitored. Based on the load condition, the controller determines whether the component is operating at a light load condition. If the component is operating at the light load condition, a switching frequency of each of stages is changed from a first switching frequency to a second switching frequency, which is less than the first switching frequency.

20 Claims, 6 Drawing Sheets

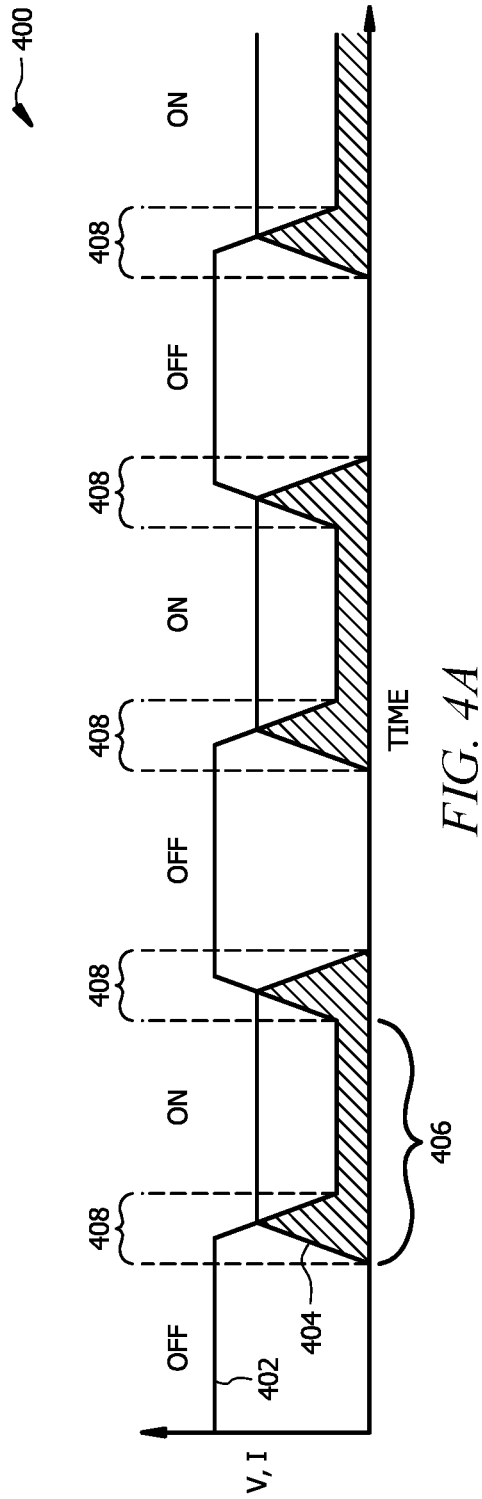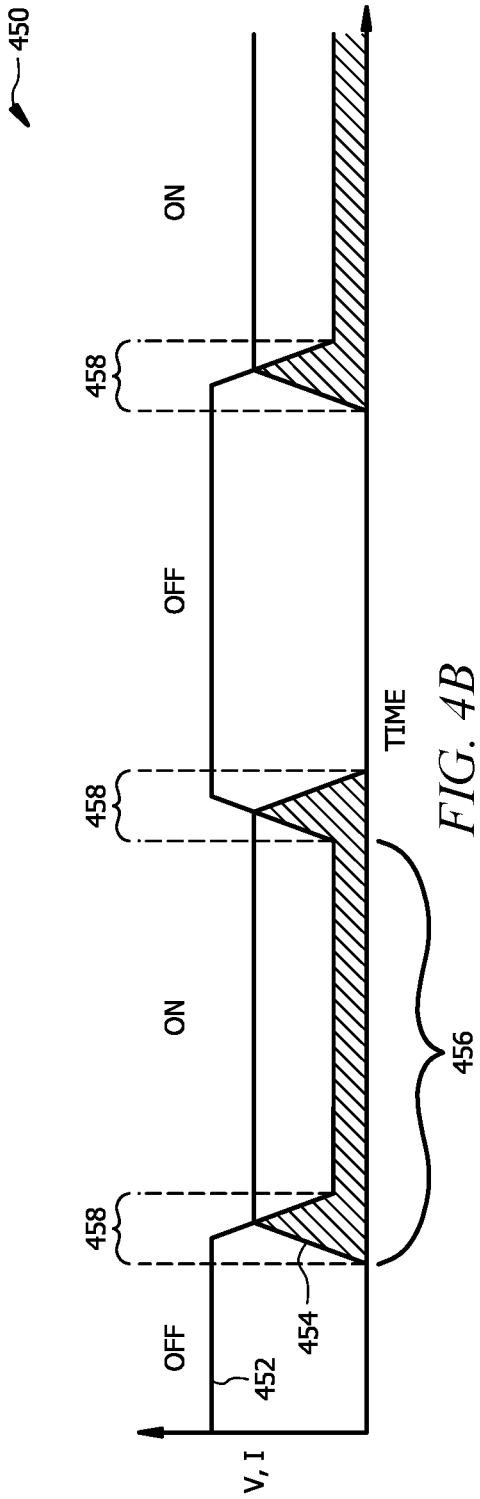

MOTOR DRIVE OPERATION AT LIGHT LOAD CONDITIONS

CROSS-REFERENCE TO RELATED APPLICATIONS

This application is a continuation of U.S. patent application Ser. No. 16/529,530 filed Aug. 1, 2019, by Jose Juan Sandoval and entitled "MOTOR DRIVE OPERATION AT LIGHT LOAD CONDITIONS," which is incorporated herein by reference.

TECHNICAL FIELD

The present disclosure relates generally to heating, ventilation, and air conditioning (HVAC) systems and methods of their use. In certain embodiments, the present disclosure relates to motor drive operation at light load conditions.

BACKGROUND

Heating, ventilation, and air conditioning (HVAC) systems are used to regulate environmental conditions within an enclosed space. Typically, HVAC systems include an evaporator coil and a condenser coil. A blower of the HVAC system pulls warm air from the enclosed space and pushes the air across the evaporator coil to cool the air. The air is cooled via heat transfer with refrigerant flowing through the evaporator coil and returned to the enclosed space as conditioned air. Meanwhile, the refrigerant flowing through the evaporator is heated and generally transitions to the vapor phase. After being pressurized by a compressor, the refrigerant from the evaporator coil flows toward the condenser coil where it is cooled before flowing back to the evaporator coil to repeat the cycle.

SUMMARY OF THE DISCLOSURE

In an embodiment, a system includes a motor-driven component, a motor configured to operate the motor-driven component, and a motor drive circuit configured to power the motor. The motor drive circuit includes at least one complementary stage, where each complementary stage includes a first transistor and a second transistor. During operation of the motor drive circuit, the first transistor is switched on when the second transistor is switched off. The system includes a controller communicatively coupled to the motor drive circuit. The controller monitors a load condition associated with the motor-driven component. The controller determines, based on the load condition, whether the motor-driven component is operating at a light load condition. Responsive to determining the motor-driven component is operating at the light load condition, the controller changes a switching frequency of each of the one or more complementary stages from a first switching frequency to a second switching frequency. The second switching frequency is less than the first switching frequency, and the switching frequency is associated with the rate at which the first and second transistors of each complementary stage are switched between an on and off state.

HVAC system may include various motor-driven components such as one or more fans, blowers, and/or compressors. Energy expended driving these components can account for a significant portion of energy required to power an HVAC system. In conventional HVAC systems, motor-driven components may be operated at different speeds at different load conditions. This disclosure encompasses the recognition that efficiency can be improved by configuring a motor drive circuit to operate motor-driven components, such as fan(s), blower(s) and/or compressor(s) of an HVAC system, at a decreased switching frequency at light load conditions.

The unconventional system contemplated in this disclosure solves problems of previous systems, including those described above, by providing systems and methods for efficiently operating motor-driven components based on load conditions. The load conditions can be associated with the components themselves (e.g., a speed and/or torque associated with the component or an associated motor) and/or a cooling or heating demand or mode of an associated HVAC system. For example, in certain embodiments, the switching frequency of a motor-drive signal provided to a compressor of an HVAC system may be decreased when the HVAC system is operating at a light load condition. The value of the switching frequency may be determined based on the torque and/or speed of the component and/or the associated motor. By operating at a decreased switching frequency at light load conditions, motor-driven components, including those of an HVAC system, can be powered more efficiently than was previously possible.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 4A-4B are plots of example motor-drive signals provided by a transistor-pair stage of the example motor drive circuit of FIG. 3;

DETAILED DESCRIPTION

Embodiments of the present disclosure and its advantages are best understood by referring to FIGS. 1 through 6 of the drawings, like numerals being used for like and corresponding parts of the various drawings.

HVAC System

Figure 1:
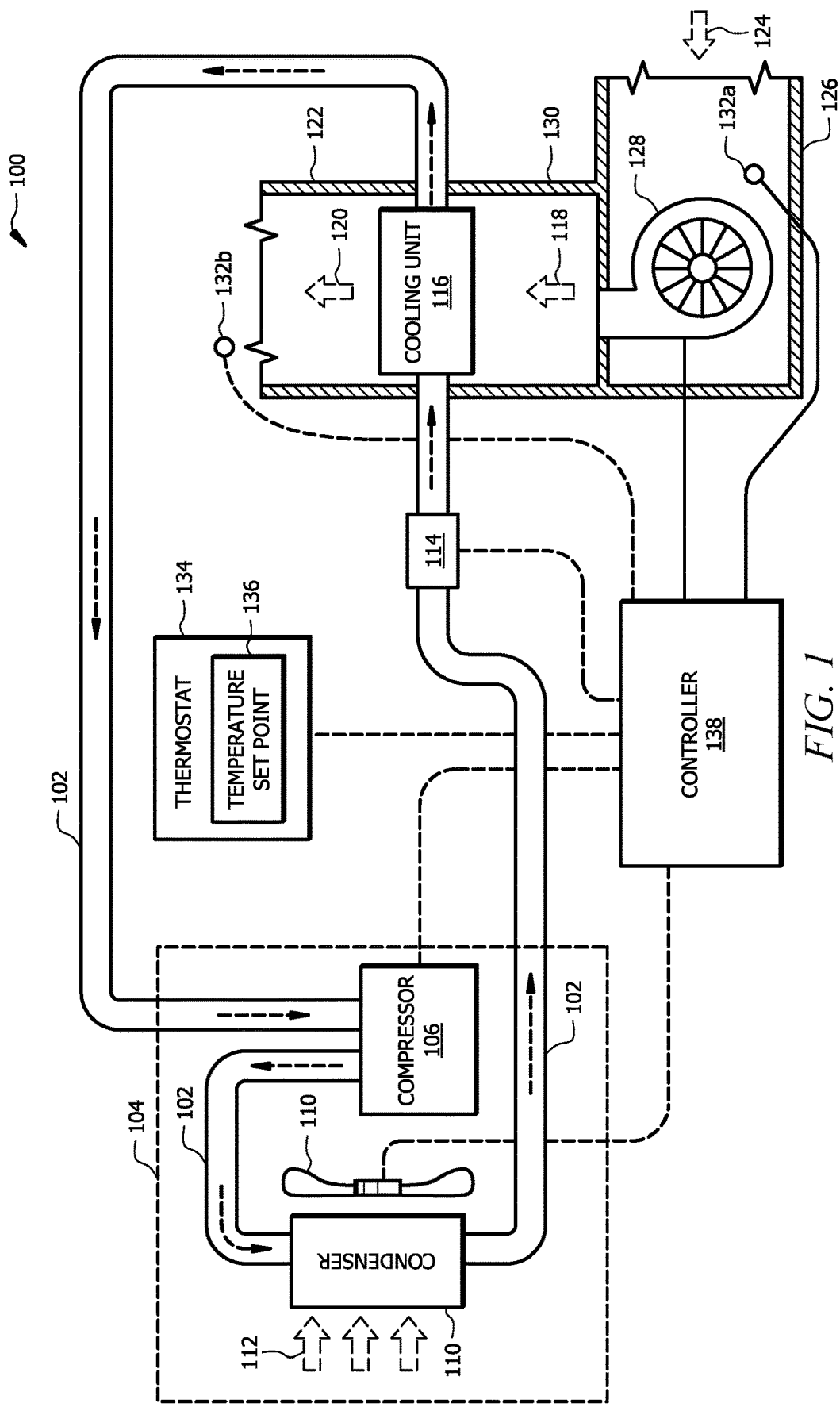
FIG. 1 is a diagram of an example HVAC system which includes motor-driven components.

FIG. 1 is a schematic diagram of an embodiment of an HVAC system 100. The HVAC system 100 conditions air for delivery to a conditioned space. Various components of the HVAC system 100 may be motor-driven components including but not limited to the compressor 106, the fan 110, and the blower 128, described in greater detail below. The conditioned space may be, for example, a room, a house, an office building, a warehouse, or the like. In some embodiments, the HVAC system 100 is a rooftop unit (RTU) that is positioned on the roof of a building and the conditioned air is delivered to the interior of the building. In other embodiments, portion(s) of the system may be located within the building and portion(s) outside the building. The HVAC system 100 may also include heating elements that are not shown here for convenience and clarity. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem 102, a condensing unit 104, an expansion valve 112, a cooling unit 116, a thermostat 134, and a controller 138. The working fluid conduit subsystem 102 facilitates the movement of a working fluid (e.g., a refrigerant) through a cooling cycle such that the working fluid flows as illustrated by the dashed arrows in FIG. 1. The working fluid may be any acceptable working fluid including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

The condensing unit 104 includes a compressor 106, a condenser 108, and a fan 110. The compressor 106 is coupled to the working-fluid conduit subsystem 102 and compresses (i.e., increases the pressure of) the working fluid. The compressor 106 of condensing unit 104 may be a variable speed or multi-stage compressor. A variable speed compressor is generally configured to operate at different speeds to increase the pressure of the working fluid to keep the working fluid moving along the working-fluid conduit subsystem 102. In the variable speed compressor configuration, the speed of compressor 106 can be modified to adjust the cooling capacity of the HVAC system 100. Meanwhile, a multi-stage compressor may include multiple compressors, each configured to operate at a constant speed to increase the pressure of the working fluid to keep the working fluid moving along the working-fluid conduit subsystem 102. In the multi-stage compressor configuration, one or more compressors can be turned on or off to adjust the cooling capacity of the HVAC system 100.

The compressor 106 is in signal communication with the controller 138 using a wired or wireless connection. The controller 138 provides commands or signals to control the operation of the compressor 106. For example, the controller 138 may operate the compressor 106 in different modes corresponding to load conditions (e.g., the amount of cooling or heating required by the HVAC system 100). As described in greater detail with respect to FIG. 2 below, the compressor 106 may be a motor-driven component (e.g., such as component 202 of FIG. 2). Accordingly, the controller 138 may provide a signal to a motor-drive circuit (e.g., the motor drive circuit 206 of FIGS. 2 and 3) which powers a motor (e.g., motor 204 of FIGS. 2 and 3) associated with the compressor 106 (e.g., component 202 of FIG. 2). The controller 138 is described in greater detail below with respect to FIG. 6.

The condenser 108 is generally located downstream of the compressor 106 and is configured to remove heat from the working fluid. The fan 110 is configured to move air 112 across the condenser 110. For example, the fan 110 may be configured to blow outside air through the condenser 108 to help cool the working fluid flowing therethrough. The fan 110 may be in signal communication with the controller 138 using a wired or wireless connection such that the controller 138 provides commands or signals to control the operation of the fan 110. The fan 110 may be a motor-driven component (e.g., such as component 202 of FIG. 2). The controller 138 may provide a signal to a motor-drive circuit (e.g., the motor drive circuit 206 of FIGS. 2 and 3) which powers a motor (e.g., motor 204 of FIGS. 2 and 3) associated with the fan 110 (e.g., component 202 of FIG. 2). The cooled working fluid from the condenser 108 flows toward an expansion device 114.

The expansion device 114 is coupled to the working-fluid conduit subsystem 102 downstream of the condenser 108 and is configured to remove pressure from the working fluid. In this way, the working fluid is delivered to the cooling unit 116 and receives heat from airflow 118 to produce a conditioned airflow 120 that is delivered by a duct subsystem 122 to the conditioned space. In general, the expansion device 114 may be a valve such as an expansion valve or a flow control valve (e.g., a thermostatic expansion valve (TXV) valve) or any other suitable valve for removing pressure from the working fluid while, optionally, providing control of the rate of flow of the working fluid. The expansion device 114 may be in communication with the controller 138 (e.g., via wired and/or wireless communication) to receive control signals for opening and/or closing associated valves.

The cooling unit 116 is generally any heat exchanger configured to provide heat transfer between air flowing through the cooling unit 116 (i.e., contacting an outer surface of one or more evaporator coils associated with the cooling unit 116) and working fluid passing through the interior of the cooling unit 116. The cooling unit 116 is fluidically connected to the compressor 106, such that working fluid generally flows from the cooling unit 116 to the compressor 106.

A portion of the HVAC system 100 is configured to move air 118 across the cooling unit 116 and out of the duct sub-system 122 as conditioned air 122. Return air 124, which may be air returning from the building, fresh air from outside, or some combination, is pulled into a return duct 126. A suction side of the blower 128 pulls the return air 124 through the duct 126. The blower 128 discharges airflow 118 into a duct 130 from where the airflow 116 crosses the cooling unit 116 or heating elements (not shown) to produce the conditioned airflow 120. The blower 128 is any mechanism for providing a flow of air through the HVAC system 100. For example, the blower 128 may be a constant-speed or variable-speed circulation blower or fan. Examples of a variable-speed blower include, but are not limited to, belt-drive blowers controlled by inverters, direct-drive blowers with electronic commuted motors (ECM), or any other suitable types of blowers.

The blower 128 is in signal communication with the controller 138 using any suitable type of wired or wireless connection. The controller 138 is configured to provide commands or signals to the blower 128 to control its operation. The blower 128 may be a motor-driven component (e.g., component 202 of FIG. 2). The controller 138 may provide a signal to a motor-drive circuit (e.g., the motor drive circuit 206 of FIGS. 2 and 3) which powers a motor (e.g., motor 204 of FIGS. 2 and 3) associated with the blower 128 (e.g., component 202 of FIG. 2).

The HVAC system 100 generally includes one or more sensors 132a,b in signal communication with the controller 138. The sensors 132a,b may include any suitable type of sensor for measuring air temperature as well as other properties of a conditioned space (e.g. a room or building). The sensors 132a,b may be positioned anywhere within the conditioned space, the HVAC system 100, and/or the surrounding environment. For example, as shown in the illustrative example of FIG. 1, the HVAC system 100 may include a sensor 132a positioned and configured to measure a return air temperature (e.g., of air flow 124) and a sensor 132b positioned and configured to measure a supply or treated air temperature (e.g., of air flow 120). In other examples, the HVAC system 100 may include sensors positioned and configured to measure any other suitable type of air temperature (e.g., the temperature of air at one or more locations within the conditioned space and/or an outdoor air temperature).

The HVAC system 100 includes one or more thermostats 134, for example located within the conditioned space (e.g. a room or building). The thermostat 134 is generally in signal communication with the controller 138 using any suitable type of wired or wireless communications. The thermostat 134 may be a single-stage thermostat, a multi-stage thermostat, or any suitable type of thermostat as would be appreciated by one of ordinary skill in the art. The thermostat 134 is configured to allow a user to input a desired temperature via a temperature setpoint 136 for a designated space or zone such as a room in the conditioned space. The controller 138 may use information from the thermostat 134 such as the temperature setpoint 136 for controlling the compressor 106, the fan 110, and/or the blower 128. For instance, the may use information from the thermostat to determine a load condition of the HVAC system 100 (e.g., whether the HVAC system is operating at or should be operating at light load conditions). For instance, the difference between a temperature of the conditioned space and the temperature setpoint 132 may be used to determine whether the HVAC system should operate at or is operating at a given load condition. Signals provided to the compressor 106, fan 110, and/or blower 128 (or to an associated motor) may be determined based on the load condition as described in greater detail below.

As described above, in certain embodiments, connections between various components of the HVAC system 100 are wired. For example, conventional cable and contacts may be used to couple the controller 138 to the various components of the HVAC system 100, including, the compressor 106, the fan 110, the expansion valve 114, the blower 128, sensor(s) 132a,b, and thermostat 134. In some embodiments, a wireless connection is employed to provide at least some of the connections between components of the HVAC system 100. In some embodiments, a data bus couples various components of the HVAC system 100 together such that data is communicated therebetween. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 138 to other components of the HVAC system 100.

Example Motor-Drive System

Figure 2:
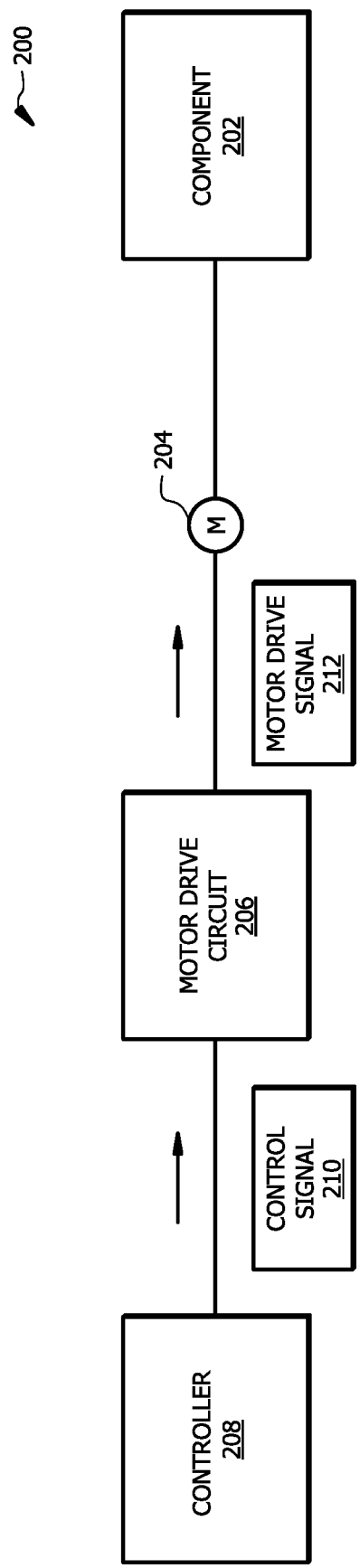
FIG. 2 is a diagram of an example system configured to power one or more of the motor-driven components of the system of FIG. 1.

FIG. 2 shows an example of a motor-drive system 200. The system 200 includes a motor-driven component 202, which may be the compressor 106, fan 110, or blower 128 of FIG. 1. The system 200 also includes a motor 204 configured to operate the component 202 and a motor drive circuit 206, which receives a control signal 210 from controller 208 and sends a motor-drive signal 212 to the motor 204. Controller 208 may be the controller 138 of FIG. 1, and controller 208 is described in greater detail below with respect to FIG. 6.

System 200 generally facilitates efficient operation of component 202 based on load conditions associated with the component 202 and/or an HVAC system (e.g., HVAC system 100) of which the component 202 is a part. For example, if the component 202 or its associated motor 204 is operating at a light load condition (e.g., at a low speed or a low torque), the motor-drive signal 208 provided to the motor may be appropriately modified to improve efficiency. In particular, this disclosure contemplates decreasing a switching frequency associated with the motor-drive signal 212, when the motor 204, the motor-driven component 202, and/or an associated HVAC system (e.g., HVAC system 100) are operating at light load conditions. For example, at normal or heavy load conditions, a switching frequency associated with a motor-drive signal may be about 16 kHz, while at a light load condition the switching frequency may be decreased to a range from about 6 kHz to less than 16 KHz. In some embodiments, a light-load switching frequency is less than 10 kHz. As a non-limiting example, light load conditions may correspond to a torque value in a range from about 5 to 20 oz-ft and/or a motor speed value in a range from about 300 to 500 rotations per minute. Light load conditions may also or alternatively be determined based on a cooling or heating demand or mode of an associated HVAC system (e.g., HVAC system 100 of FIG. 1).

As described above, the motor-driven component 202 may be any of the compressor 106, the fan 110, or the blower 128 of the HVAC system 100, described above. While the example of FIG. 2 is generally described in the context of operating along with or within an HVAC system, such as HVAC system 100, it should be understood that system 200 may be used in any other appropriate context involving a motor-driven component 202 and is not limited to a motor-driven component 202 of an HVAC system.

Motor 204 is generally any appropriate motor configured to operate component 202. For example, motor 204 may be a motor of a compressor (e.g., compressor 106 of FIG. 1), a fan (e.g., fan 110 of FIG. 1), or a blower (e.g., blower 128 of FIG. 1). The motor 204 may be any electrically powered motor that is powered by a motor-drive signal 212. For example, the motor 204 may be an induction motor. Motor-drive signal 212 may be a pulse-width modulated signal. Motor drive circuit 206 is generally any appropriate circuit for providing the motor-drive signal 212 in order to drive the motor 204. For instance, the motor drive circuit 206 may be a direct current-alternating current (DC-AC) inverter circuit.

Figure 3:
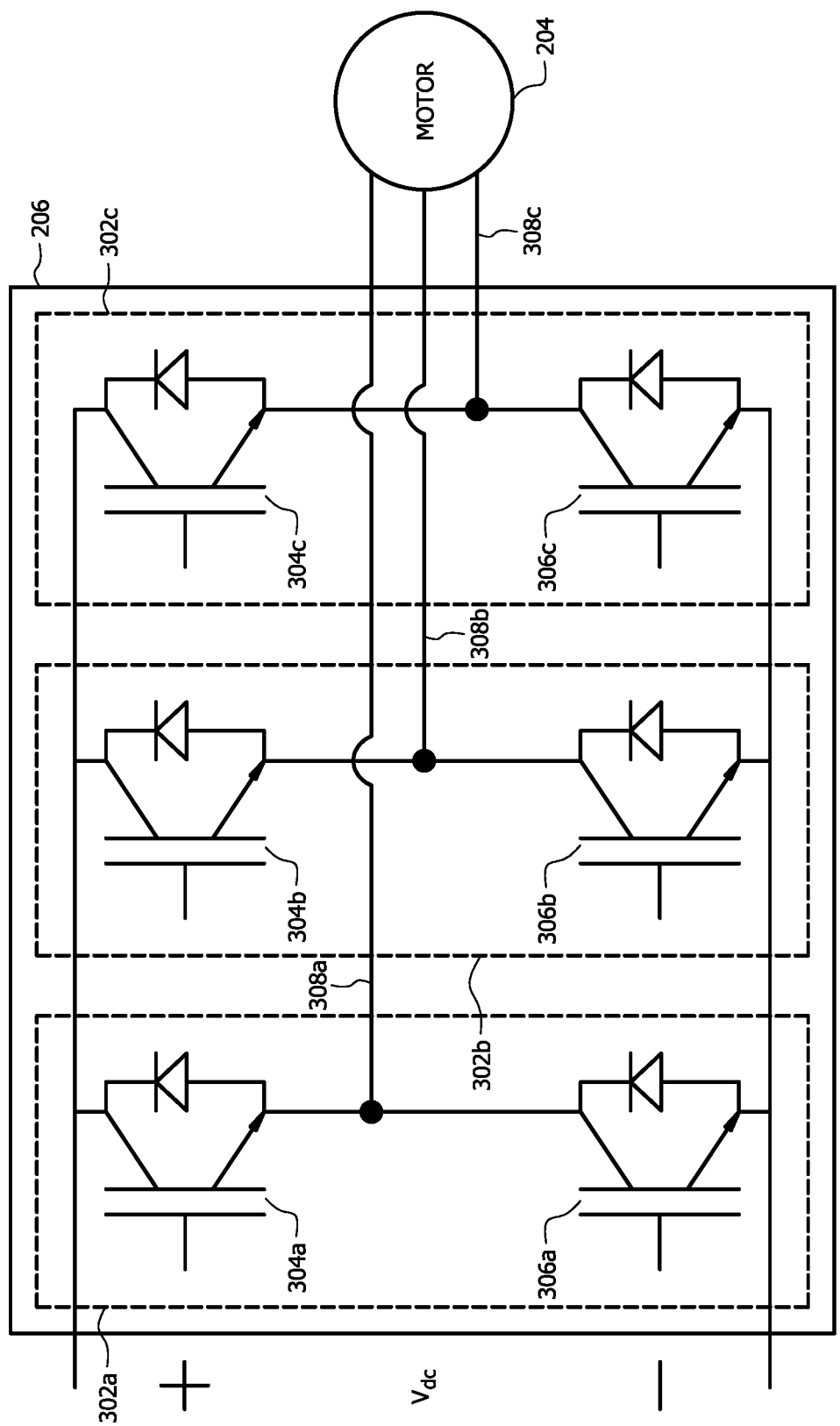
FIG. 3 is a diagram of an example motor drive circuit for use in the system of FIG. 2.

FIG. 3 shows a circuit diagram of an example of the motor drive circuit 206 of FIG. 2. As shown in FIG. 3, motor drive circuit 206 may include three stages 302a-c, where each stage 302a-c includes a corresponding pair of transistors (transistors 304a-c and 306a-c). For example, the first stage 302a has a first transistor 304a and a second transistor 306a. Similarly, stages 302b and 302c have corresponding first transistors 304b and 304b, respectively, and second transistors 306b and 306c, respectively. Signal(s) and/or commands (e.g., control signal(s) 210) received from the controller 208 provide instructions for operation of each stage 302a-c. For example, the controller 208 may provide signal(s) 210 and/or command(s) associated with the frequency at which transistors 304a-c and 306a-care turned on and off (e.g., to provide an appropriately modulated signal for powering the motor 204). Each stage 302a-c has a corresponding signal output 308a-c. The motor-drive signal 212 of FIG. 2 may include signals from each of the outputs 308a-c. Examples of signals 308a-c are shown in FIG. 4.

During operation of the motor drive circuit 206, when a first transistor 304a-c of a given stage 302a-c is turned on, a second transistor 306a-c is turned off (and vice versa). For instance, if, at a given time during operation of stage 302a, transistor 304a is in an on state (e.g. corresponding to a state in which current can flow through transistor 304a), the associated second transistor 306a is in an off state (e.g. corresponding to a state in which current cannot flow through transistor 306a).

In an example operation of system 200, the controller 208 provides (e.g., transmits) a control signal 210 to the motor drive circuit 206. The control signal 210 causes stages 302a-c to operate such that a switching frequency of each stage (i.e., the frequency at which each of signals 308a-c switch between an on and off state, which is associated with the frequency at which transistors 304a-c and 306a-c are switched on and off). FIG. 4A shows an example of a voltage signal 402 and current signal 404 provided by one of the stages 302a-c of the motor drive circuit 206 (e.g., as signals 308a-c of FIG. 3). The voltage signal 402 and current signal 404 of FIG. 4A are at an initial switching frequency associated with normal operation of the component (e.g., motor-driven component 202 of FIG. 2). During the "off" times shown in FIG. 4A, the voltage signal 402 is relatively large and the current signal 404 is negligible or zero. During the "on" times shown in FIG. 4A, the voltage signal 402 is at a relatively small but non-zero value and the current signal 404 is relatively large.

The switching frequency for a signal 308a-c of a given stage 302a-c corresponds to the rate at which the corresponding transistors 304a-c and 306a-c are turned on and off (e.g., the number of times the current signal 404 switches between on and off states per unit of time). The switching frequency is inversely proportional to the period 406 shown in FIG. 4A. For example, the initial switching frequency during operation of system 200 may be 16 kHz. A transition period 408 occurs between the off and on times. Power losses, which are proportional to the current signal 404 multiplied by the voltage signal 402, are illustrated by the shaded regions in FIG. 4A. Power losses during the "on" periods are referred to as conduction losses. Power losses during each switching transition period 408 are referred to as switching losses. This disclosure encompasses the recognition that at light load conditions, switching losses are dominant over conduction losses and that decreasing the switching frequency (e.g. or increasing the period 406 between on and off states) can reduce these losses, thereby improving motor drive efficiency.

To achieve this improved efficiency, the motor drive circuit 206 and/or the controller 208 may monitor a load condition associated with the motor-driven component 202. The load condition may be associated with a speed and/or torque associated with the motor 204 of the component 202 and/or the component 202 itself For example, if the component 202 is the compressor 106 of FIG. 1, the motor drive circuit 206 or the controller 138 may determine a speed of the compressor 106 or a torque associated with the compressor 106 (e.g., a torque provided by a motor of the compressor 106). For instance, the compressor 106 (and/or the associated motor) may include one or more sensors for measuring a speed and/or torque associated with the compressor 106. For instance, a torque sensor may be located on or embedded within the motor of the compressor 106, and a signal provided by this sensor may be used to determine a torque associated with the compressor 106. Generally, a decreased speed and/or torque corresponds to a lighter load condition.

The load condition may also or alternatively be associated with a cooling or heating mode and/or demand of an HVAC system associated with the component 202. For instance, if the component 202 is the compressor 106, fan 110, or blower 128 of HVAC system 100 of FIG. 1, the load condition may be associated with a cooling or heating mode and/or demand of the HVAC system 100. For example, a light load condition may correspond to operating conditions in which the setpoint temperature 136 of FIG. 1 is within a threshold temperature difference from the temperature of a conditioned space. For example, if the temperature of the space is within 2° F. or less of the setpoint temperature 136, the cooling or heating demand of the HVAC system 100 may be relatively low, corresponding to light load conditions. Conversely, if the temperature of the space is further from the setpoint temperature 136 (e.g., greater than 2° F. from the setpoint temperature 136 or greater than 5° F. from the setpoint temperature 136) the HVAC system 100 is not operating at light load conditions.

The controller 208 then determines, based on the load condition, whether the component 202 or an associated HVAC system (e.g., HVAC system 100 of FIG. 1) is operating at a light load condition. For instance, the controller may compare one or more of the metrics associated with load conditions (e.g., a speed and/or torque associated with the component 202 and/or motor 204, e.g., an operating mode or cooling/heating demand of the HVAC system 100) to an associated threshold (e.g., a threshold torque or speed value). For example, if the torque associated with the component 202 and/or the motor 204 is below a threshold torque value (e.g., of 20 oz-ft), the component 202 may be determined to be operating at a light load condition. In another example, if the speed associated with the component 202 and/or the motor 204 is below a threshold speed value (e.g., of 500 rpm), the component 202 may be determined to be operating at a light load condition.

The controller 208 may also or alternatively use operational information about an HVAC system associated with the component 202 (e.g., information about HAVC system 100 of FIG. 1) to determine whether the component 202 is operating at a light load condition. For instance, an operational mode (e.g., light mode, normal mode, high mode, etc.) provided by the thermostat 134 may be used to determine whether the component 202 (e.g., the compressor 106, the fan 110, and/or the blower 128 of FIG. 1) is operating at a light load condition. For example, if the thermostat 134 indicates the HVAC system 100 is operating at a light load mode, the controller 208 may determine that the component 202 (e.g., the compressor 106, the fan 110, and/or the blower 128 of FIG. 1) is operating at a light load condition.

If the component 202 is operating at a light load condition, the control signal 210 causes the motor drive circuit 206 to generate a motor drive signal 212 that is a light-load signal. A light-load signal is associated with a decreased switching frequency for signals 808a-c (e.g., or a decreased frequency at which corresponding transistors 304a-c and 306a-c are turned on and off) compared to that used during normal or high load operation. FIG. 4B shows an example of a portion of a motor drive signal 212 (e.g., corresponding to a signal 308a-c from one of the stages 302a-c) that is a light-load signal. FIG. 4B shows a voltage signal 452 and current signal 454 after the switching frequency has been decreased for a light load condition relative to signals 402 and 404 shown in FIG. 4A. The voltage signal 452 and current signal 454 of FIG. 4B have a longer on-off period 456 and thus a lower switching frequency compared to signals 402 and 404 of FIG. 4A. For example, the switching frequency may be decreased from an initial frequency of 16 kHz to a decreased light-load switching frequency that is in a range from less than 16 kHz to about 6 kHz. At the decreased switching frequency shown in FIG. 4B, switching losses during switching period 458 are decreased during a given operation time, because fewer switching periods 458 occur in the operation time (i.e., there are fewer switching periods 458 than there are switching periods 408 in the same period of time depicted in FIGS. 4A and B).

TABLE 1 shows examples of calculated switching losses (e.g., during switching periods 408 and 458 of FIGS. 4A and 4B) and drive efficiencies achieved at different switching frequencies from 16 kHz to 6 kHz. Drive efficiency is generally the ratio of the electrical power provided by a motor drive (e.g., motor drive 206 of FIG. 2) to the electrical power input to drive the motor (e.g., motor 204 of FIG. 2). In general, drive efficiency increases when the switching frequency is decreased, as shown in TABLE 1, and the increase in efficiency with decreased switching frequency is unexpectedly larger at lighter load conditions (e.g., for Loads 1 and 2 of TABLE 1) than at higher (although still light) load conditions (e.g., for Load 3 of TABLE 1).

TABLE 1

Calculated switching losses and drive efficiencies for different load conditions and different switching frequencies (fswitching).

| fswitching | Load 1 (5 oz-ft, 300 rpm) | | Load 2 (10 oz-ft, 400 rpm) | | Load 3 (15 oz-ft, 500 rpm) | |
| --- | --- | --- | --- | --- | --- | --- |
| | Switching Losses | Drive Efficiency | Switching Losses | Drive Efficiency | Switching Losses | Drive Efficiency |
| 16 kHz | 2.04 W | 68% | 2.52 W | 81% | 3.12 W | 86.6% |
| 8 kHz | 1.02 W | 71% | 1.26 W | 83% | 1.56 W | 88.2% |
| 6 kHz | 0.72 W | 72% | 0.72 W | 84% | 1.14 W | 88.6% |

The light-load switching frequency may be determined based on one or both of a torque associated with the component 202 and a motor speed associated with the motor 204. The light-load switching frequency may be determined based on calibration information in a lookup table, wherein the lookup table comprises a calibrated switching frequency value for each of one or more load conditions. For example, TABLE 2 shows a portion of an example lookup table for determining a switching frequency for a given load condition. In this example, the load condition is determined based on a torque and speed of the motor 204 and/or component 202. The light-load switching frequency values provided in TABLE 2 are for illustrative purposes. Any other appropriate light-load switching frequencies may be appropriate for a given application or use case (e.g., as long as the light-load switching frequencies are less than an initial switching frequency used during operation at normal or high load conditions). In some embodiments, a lookup table of light-load switching frequencies is determined (e.g., via calibration) for each component 202, for each component 202 and motor 204 pair, or for each HVAC system 100 comprising the component 202 and/or motor 204.

TABLE 2

Example portion of a lookup table for determining a switching frequency (kHz) based on a load condition associated with torque (oz-ft) and motor speed (rpm).

| Torque/Motor speed | 300 rpm | 350 rpm | 400 rom | 450 rpm | 500 rpm |
| --- | --- | --- | --- | --- | --- |
| 5 oz-ft | 6 kHz | 6 kHz | 6 kHz | 6 kHz | 8 kHz |
| 10 oz-ft | 6 kHz | 6 kHz | 6 kHz | 8 kHz | 8 kHz |
| 15 oz-ft | 6 kHz | 6 kHz | 8 kHz | 10 kHz | 10 kHz |
| 20 oz-ft | 6 kHz | 8 kHz | 8 kHz | 10 kHz | 12 kHz |

Example Method of Operation

Figure 5:
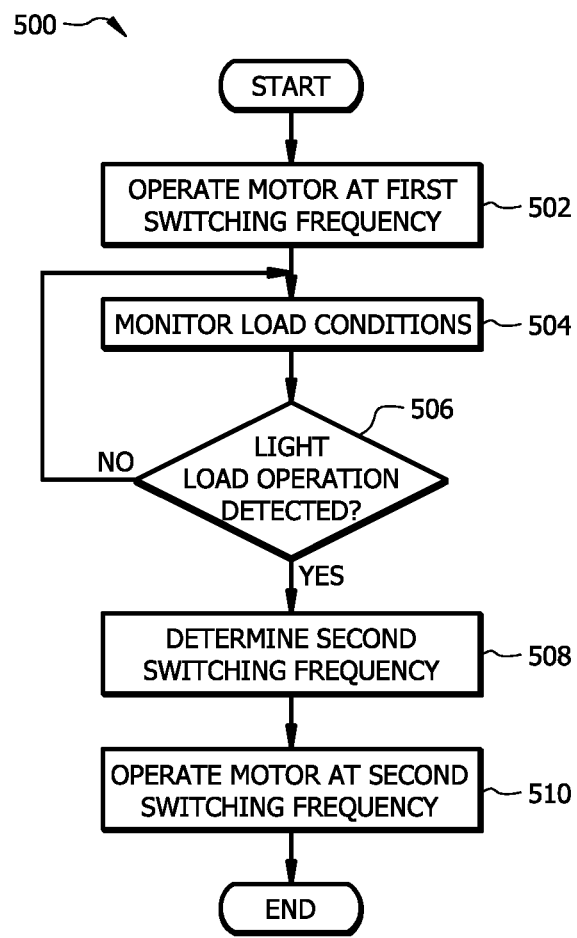
FIG. 5 is a flowchart illustrating an example method of operating the system of FIG. 2.

FIG. 5 is a flowchart of an example method 500 for operating system 200 of FIG. 2. As described above, system 200 may be a portion of the HVAC system 100 such that the motor driven component 202 may be any of the compressor 106, the fan 110, or the blower 128 of the HVAC system 100 shown in FIG. 1. Controller 208 may be controller 138 of FIG. 1. At step 502, the component 202 may be operated at a first switching frequency. For example, upon startup of the system 200 (e.g., upon startup of the compressor 106, the fan 110, and/or the blower 128 of FIG. 1), the component 202 may be operated at a first switching frequency corresponding to a normal or high load operation. For instance, the component might be operated at an initial switching frequency of about 16 kHz.

At step 504, the load condition associated with the component 202 is monitored. For example, the controller 208 may monitor a speed and/or torque associated with the component 202 and/or the corresponding motor 204. The controller 208 may also or alternatively determine load conditions for an HVAC system (e.g., HVAC system 100) associated with the component 202. For example, the controller 208 may monitor a cooling or heating mode and/or demand of an HVAC system associated with the component 202. For example, a low load or low demand condition may correspond to operating conditions in which the demand is relatively low such as when the setpoint temperature 136 of FIG. 1 is within a threshold temperature difference (e.g., of about 2° F.) from the temperature of a conditioned space, as described above.

At step 506, the motor drive circuit 206 and/or the controller 208 determines whether light load conditions are detected. For example, the controller may determine whether one or both of the torque and the speed of the motor 204 is below a corresponding threshold value associated with light load operation. For instance, the motor drive circuit 206 and/or the controller 208 may determine that light load operation is detected if the torque of the component 202 and/or the motor 204 is less than or equal to about 20 oz-ft and/or if the speed of the component 202 and/or the motor 204 is less than or equal to about 500 rpm. Additionally or alternatively, the controller 208 may determine whether an HVAC system associated with the component 202 (e.g., HVAC system 100 of FIG. 1) is operating at light load conditions, as described above. In some embodiments, an operating load mode (e.g., light mode, normal mode, heavy mode, etc.) may be provided by the thermostat 134 and this information may be used to determine whether a light load is detected. If a light load is not detected, the controller 208 returns to step 504 to continue monitoring load conditions.

If a light load condition is detected at step 506, a second switching frequency is determined at step 508. The second switching frequency is generally less than the first switching frequency. The second switching frequency may be determined, for example, based on a torque and/or a speed associated with the component 202 and/or the motor 204. For instance, the second switching frequency may be determined based on information in a lookup table, such as the example lookup table shown in TABLE 2. In some embodiments, the second switching frequency is based on operational conditions and/or parameters of an HVAC system associated with the component 202 (e.g., HVAC system 100 of FIG. 1). For instance, the second switching frequency may be determined based on a difference between a measured conditioned air temperature and a temperature setpoint (e.g., setpoint 136 associated with HVAC system 100).

At step 510, the motor 204 associated with component 202 is operated at the second switching frequency determined at step 508, thereby improving efficiency of the component 202 at light load conditions. In general the system may continue to monitor the load conditions associated with the component 202, and, responsive to the component 202 no longer operating at light load conditions or to the component 202 operating at a different light load condition, the switching frequency may be adjusted either back to the first switching frequency or to a third switching frequency based on the currently determined load condition.

Modifications, additions, or omissions may be made to method 300 depicted in FIG. 5. Method 500 may include more, fewer, or other steps. For example, steps may be performed in parallel or in any suitable order. While at times discussed as controller 208, or components thereof performing the steps, any suitable components (e.g., of system 200 or the HVAC system 100 of FIG. 1) may perform one or more steps of the method. For example, the motor drive circuit 206 may perform one or more steps of method 500.

Example Controller

Figure 6:
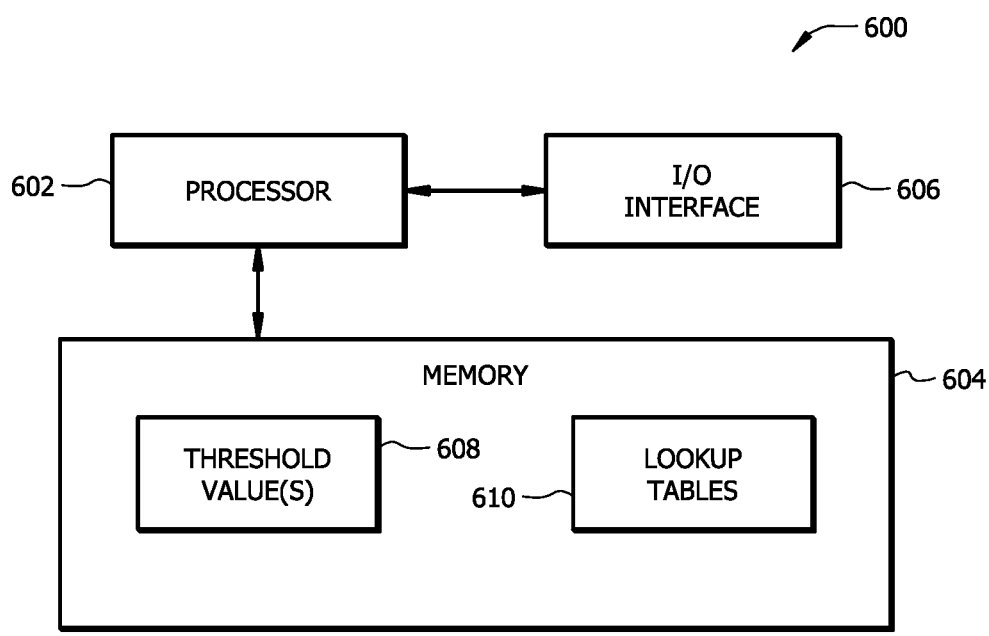
FIG. 6 is a diagram of an example controller of the systems of FIGS. 1 and 2.

FIG. 6 is a schematic diagram of an embodiment of the controllers 138, 208 described above. The controllers 138, 208 include a processor 602, a memory 604, and an input/output (I/O) interface 606.

The processor 602 includes one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 604 and controls the operation of HVAC system 100. The processor 602 may be a programmable logic device, a microcontroller, a microprocessor, or any suitable combination of the preceding. The processor 602 is communicatively coupled to and in signal communication with the memory 604. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory 604 and executes them by directing the coordinated operations of the ALU, registers, and other components. The processor may include other hardware and software that operates to process information, control the HVAC system 100, and perform any of the functions described herein (e.g., with respect to FIG. 3). The processor 602 is not limited to a single processing device and may encompass multiple processing devices. Similarly, each of the controllers 138,208 is not limited to a single controller but may encompass multiple controllers.

The memory 604 includes one or more disks, tape drives, or solid-state drives, and may be used as an over-flow data storage device, to store programs when such programs are selected for execution, and to store instructions and data that are read during program execution. The memory 604 may be volatile or non-volatile and may include ROM, RAM, ternary content-addressable memory (TCAM), dynamic random-access memory (DRAM), and static random-access memory (SRAM). The memory 604 is operable to store one or more threshold values 608 and lookup tables 610.

The threshold values 608 include any of the thresholds used to implement the functions described herein including thresholds associated with detecting light load operation of component 202 of FIG. 2 and/or of HVAC system 100. For example, the threshold values 608 may include threshold torque values and/or speed values associated with motor 204 and/or component 202. Threshold values 608 may include thresholds associated with operation of the HVAC system 100 that indicate operation at a light load condition. For example, threshold values correspond to a threshold value or range of values associated with the speed or torque of motor 204 and/or the component 202. As another example, threshold values may correspond to cooling or heating demands associated with light load operation of HVAC system 100). The lookup tables 610 generally include any information for determining a switching frequency at which to operate the component 202 of FIG. 2 when a light load condition is detected. For example, the lookup tables may include values of switching frequencies where each switching frequency corresponds to one or more of a determined torque of the motor 204, speed of the motor 204, and/or any other operational characteristic of an associated HVAC system (e.g., HVAC system 100), as described with respect to TABLE 2 above.

The I/O interface 606 is configured to communicate data and signals with other devices. For example, the I/O interface 606 may be configured to communicate electrical signals with components of the HVAC system 100 and system 200 including the compressor 106, the fan 110, the expansion valve 114, the blower 128, sensors 132a,b, the thermostat 134, and the motor drive circuit 206. The I/O interface may receive, for example, thermostat calls, temperature setpoints, environmental conditions, and an operating mode status for the HVAC system 100 and send electrical signals to the components of the HVAC system 100. The I/O interface 606 may include ports or terminals for establishing signal communications between the controllers 138, 208 and other devices. The I/O interface 606 may be configured to enable wired and/or wireless communications.

One or more of the components of the controllers 138, 238 described above may also or alternatively be included in the motor drive circuit 206 of FIG. 2. For example, the motor drive circuit 206 may include the processor 602, memory 604, and/or I/O interface 606. For example, if processor 602 is included in the motor drive circuit 206 of FIG. 2, the processor 602 of the motor drive circuit 206 may be configured to determine whether the HVAC system is operating in a light condition, as described in greater detail above. If the memory 604 is included in the motor drive circuit 206 of FIG. 2, this memory 604 of the motor drive circuit 206 may store threshold values 608 (e.g., associated with whether the HVAC system 100 is operating at a light load condition) and/or lookup tables 610 (e.g., associated with information used to determine a switching frequency at which to operate the component 202 of FIG. 2 when a light load condition is detected).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a motor-driven component of an HVAC system;
a motor configured to operate the motor-driven component;
a motor drive circuit configured to power the motor, the motor drive circuit comprising at least one complementary stage, wherein each complementary stage of the at least one complementary stage comprises a first transistor and a second transistor, wherein, during operation of the motor drive circuit, the first transistor is switched on when the second transistor is switched off; and
a controller communicatively coupled to the motor drive circuit, the controller operable to:
change a switching frequency of each of the one or more complementary stages from a first switching frequency to a second switching frequency, wherein the first switching frequency is about 16 kHz and the second switching frequency is in a range from about 6 kHz to less than 16 kHz, wherein the switching frequency is associated with the rate at which the first and second transistors of each complementary stage are switched between an on and off state; and
in response to changing the switching frequency of each of the one or more complementary stages, reduce the number of transition periods by increasing a period of time between being switched from the on and off states for each of the first transistors and the second transistors.

2. The system of claim 1, wherein:
the motor drive circuit comprises three complementary stages; and
the controller is further configured to change the switching frequency of each complementary stage to the second frequency.

3. The system of claim 1, wherein the controller is further configured to monitor a load condition associated with the motor-driven component and change the switching frequency responsive to the load condition, and the load condition is associated with one or both of a torque associated with the motor-driven component and a motor speed associated with the motor-driven component.

4. The system of claim 3, wherein the controller is further configured to monitor a load condition associated with the motor-driven component and change the switching frequency responsive to the load condition, and the load condition corresponds to one or both of a torque value in a range from about 5 to 20 oz-ft and a motor speed value in a range from about 300 to 500 rotations per minute.

5. The system of claim 1, wherein the controller is further configured to determine the second switching frequency based on calibration information in a lookup table, wherein the lookup table comprises a calibrated switching frequency value for each of a plurality of load conditions for the motor-driven component.

6. The system of claim 1, wherein the motor-driven component is a fan, compressor, or blower of the HVAC system.

7. The system of claim 6, wherein the controller is further configured to:
monitor a load condition associated with the motor-driven component and change the switching frequency responsive to the load condition, and the load condition is associated with a cooling demand of the HVAC system;
determine a temperature difference between a temperature setpoint associated with the HVAC system and a temperature of space conditioned by the HVAC system;
determine that the load condition is a light load condition if the temperature difference is less than a threshold value.

8. A method comprising:
changing a switching frequency of each of one or more complementary stages of a motor drive circuit configured to operate the motor-driven component from a first switching frequency to a second switching frequency, wherein the first switching frequency is about 16 kHz and the second switching frequency is in a range from about 6 kHz to less than 16 kHz, wherein:
the switching frequency is associated with the rate at which a first transistor and a second transistor of each complementary stage are switched between an on and off state; and
during operation of the motor drive circuit, for each complementary stage, the first transistor of stage is switched on when the second transistor is switched off; and in response to changing the switching frequency of each of the one or more complementary stages, reducing the number of transition periods by increasing a period of time between being switched from the on and off states for each of the first transistors and the second transistors.

9. The method of claim 8, wherein:
the motor drive circuit comprises three complementary stages; and
the method further comprises changing the switching frequency of each stage to the second frequency.

10. The method of claim 8, further comprising monitoring a load condition associated with the motor-driven component and changing the switching frequency responsive to the load condition, wherein the load condition is associated with one or both of a torque associated with the motor-driven component and a motor speed associated with the motor-driven component.

11. The method of claim 10, further comprising monitoring a load condition associated with the motor-driven component and changing the switching frequency responsive to the load condition, wherein the load condition corresponds to one or both of a torque value in a range from about 5 to 20 oz-ft and a motor speed value in a range from about 300 to 500 rotations per minute.

12. The method of claim 8, further comprising determining the second switching frequency based on calibration information in a lookup table, wherein the lookup table comprises a calibrated switching frequency value for each of a plurality of load conditions for the motor-driven component.

13. The method of claim 8, wherein the motor-driven component is a fan, compressor, or blower of the HVAC system.

14. The method of claim 13, further comprising:
monitoring a load condition associated with the motor-driven component;
changing the switching frequency responsive to the load condition, wherein the load condition is associated with a cooling demand of the HVAC system;
determining a temperature difference between a temperature setpoint associated with the HVAC system and a temperature of space conditioned by the HVAC system; and
determining that the load condition is a light load condition if the temperature difference is less than a threshold value.

15. A controller communicatively coupled to a motor-drive circuit associated with a motor-driven component, the controller configured to:
cause the motor-drive circuit to transmit a light-load signal to a motor of the motor-driven component;
wherein the motor drive circuit comprises at least one complementary stage, each complementary stage of the at least one complementary stage comprising a first transistor and second transistor, wherein, during operation of the motor drive circuit, the first transistor is switched on when the second transistor is switched off; and
wherein the motor-drive circuit is configured to change a switching frequency of each of the one or more complementary stages from a first switching frequency to a second switching frequency, wherein the first switching frequency is about 16 kHz and the second switching frequency is in a range from about 6 kHz to less than 16 kHz, wherein the switching frequency is associated with the rate at which the first and second transistors of each complementary stage are switched between an on and off state; and
in response to changing the switching frequency of each of the one or more complementary stages, reduce the number of transition periods by increasing a period of time between being switched from the on and off states for each of the first transistors and the second transistors.

16. The controller of claim 15, further configured to monitor a load condition associated with the motor-driven component and change the switching frequency responsive to the load condition, wherein the load condition is associated with one or both of a torque associated with the motor-driven component and a motor speed associated with the motor-driven component.

17. The controller of claim 16, further configured to monitor a load condition associated with the motor-driven component and change the switching frequency responsive to the load condition, wherein the light load condition corresponds to one or both of a torque value in a range from about 5 to 20 oz-ft and a motor speed value in a range from about 300 to 500 rotations per minute.

18. The controller of claim 15, wherein the controller is further configured to determine the second switching frequency based on calibration information in a lookup table, wherein the lookup table comprises a calibrated switching frequency value for each of a plurality of load conditions for the motor-driven component.

19. The controller of claim 15, wherein the motor-driven component is a fan, compressor, or blower of the HVAC system.

20. The controller of claim 15, further configured to:
monitor a load condition associated with the motor-driven component;
change the switching frequency responsive to the load condition, wherein the load condition is associated with a cooling demand of the HVAC system, wherein the load condition is associated with a cooling demand of the HVAC system;
determine a temperature difference between a temperature setpoint associated with the HVAC system and a temperature of space conditioned by the HVAC system;
determine that the load condition is a light load condition, if the temperature difference is less than a threshold value.

* * * * *